H. RICHARDSON.
GRAIN UNLOADING PROCESS AND GRAIN CAR TRACK CONSTRUCTION.
APPLICATION FILED NOV. 22, 1919.

1,350,736.  Patented Aug. 24, 1920.
7 SHEETS—SHEET 2.

INVENTOR
HENRY, RICHARDSON
BY
ATTY'S.

UNITED STATES PATENT OFFICE.

HENRY RICHARDSON, OF PASSAIC, NEW JERSEY.

GRAIN-UNLOADING PROCESS AND GRAIN-CAR TRACK CONSTRUCTION.

1,350,736. Specification of Letters Patent. Patented Aug. 24, 1920.

Application filed November 22, 1919. Serial No. 339,819.

*To all whom it may concern:*

Be it known that I, HENRY RICHARDSON, a subject of the King of Great Britain, and resident of Passaic, State of New Jersey, United States of America, have invented certain new and useful Improvements in Grain-Unloading Processes and Grain-Car Track Construction, and do hereby declare the following to be a full, clear, and exact description of the same, such as will enable those skilled in the art to which it appertains to make and use the same.

This invention relates to improvements in track construction particularly adapted for use in yards associated with grain elevators, and the objects of the invention are to permit of a plurality of grain cars being readily dumped and transferred from one line to another, so that while loaded cars are being continuously dumped, the empty cars can be continuously taken away without interfering with the unloading operation.

It is also found in the present method of unloading grain cars, that a considerable amount of grain is left in the car which necessitates the sweeping of the car to complete the dumping process and as the sweeping occupies a little time it necessitates the grain car being retained on the railway track in the position in which it was originally dumped, so that all the grain sweepings may be discharged from the car and delivered to the elevator.

This naturally prolongs the time of dumping or unloading the car, and prevents other cars from being brought into position for unloading or dumping, until the previous car has been completely unloaded.

A further object of the present invention is to permit of the sweeping operation being accomplished while the car after being primarily dumped is being conveyed from the incoming track to an outgoing or return track.

Other objects still, are to permit of the weighman on the elevator into which the grain is ultimately delivered being notified when each car is being dumped, so that he is then enabled to check the weight of each car individually, and with a rapidity which heretofore has been impossible, and in this way the dumping of the cars is accelerated resulting in a considerable saving of time and labor.

With the above and other objects in view, the invention consists essentially of the improved track construction particularly described and set forth in the following specification and accompanying drawings forming part of the same.

In the drawings:

Figs. 3, 3<sup>A</sup> and 3<sup>B</sup> represent a side elevation of the track construction shown in Figs. 2, 2<sup>A</sup> and 2<sup>B</sup>.

Like characters of reference refer to like parts in the several figures.

Referring to the drawings, A represents a railway track which in the embodiment illustrated is formed with two sets of double lines B and C on the former of which the grain cars H are initially positioned prior to dumping, while they are delivered subsequently to the track C when emptied.

Intermediate of the double tracks, a treble track is shown comprising side tracks D and the center track E the former of which provides means whereby the grain cars are brought into position ready for dumping, while the center track E provides means for taking the empties away.

Adjacent to these three sets of tracks, movable tables F are mounted on a transversely extending track G and these tables F are provided with wheels 10 engaging with the rails of the said track.

By reference to Fig. 4 it will be seen that the track G is located in a pit 8 in which a pair of hoppers 11 are built, and these hoppers are provided with a discharge conduit or outlet 12 below which a belt conveyer 13 is located.

The tables F are provided on one side with a longitudinally extending foot board 14 having steps 15 at the ends thereof, and the deck of the tables F is provided with rails 16 which may be brought into alinement with either of the tracks B, C, D or E as the table F is moved transversely to the said lines over the track G.

Below the foot board 14, a pivotally mounted guide plate 17 is hung, adapted to occupy the position shown in dotted and full lines in Fig. 4.

It will be seen that when the left hand table F is moved toward the right hand side of the track B to the track C or from the track D to the track E, the plate 17 will swing from the position shown in full lines to that shown in dotted lines, and when the table F is at the opposite side of the transverse track G, and is moved toward the left side, the plate 17 will swing in the opposite direction, and lie on the opposite angle to that shown by the dotted lines.

At the rear of this transverse track G, a plurality of tracks J are arranged in alinement with the track B, C, D and E and form a part thereof, when the tables F are so positioned that the rails 16 are in alinement with either of the said tracks. Below the tracks J, hoppers 7 are arranged, into which the contents of the grain car H may be dumped.

The tracks B and D are provided with hoppers 18 such as have been described in my Patent No. 1,264,859, granted April 30, 1918, so that the grain cars H brought along the tracks B and D are positioned relatively to the hoppers 18 and the said cars may be tipped endwise and sidewise to dump the contents of the car into the hopper 18.

This method of dumping the grain cars has been fully described in my patent above referred to and need not be enlarged upon here.

The bottom of each hopper 18, is provided with a valve 19 pivotally connected to the lower end of the lever 20 which is fulcrumed intermediate of its length to the bracket 21 mounted on the hoppers 18, the upper end of the lever 20 being connected through the link 22, to a lever 23, so that a workman superintending the unloading of the cars H, can on actuation of the lever 23, open the valve 19 and permit the contents of the hopper being dumped on the belt conveyer 13 below the discharge end of the said hopper.

During this part of the operation, the main bulk of the grain will be discharged into the hopper 18 but a small amount of grain will still be left in the car and this grain must be swept out to complete the dumping of the car.

It is important however that the car H should not be detained too long over the hoppers 18, as it would naturally prevent the next grain car from being dumped and a considerable amount of time would consequently be lost, so that to facilitate the dumping operation the car H is now moved to one of the tables F, the rails 16 of which are in alinement with the track on which the grain car H is running.

As soon as the grain car H is positioned on the table F, a man will ascend the steps 15 onto the foot board 14 and enter the grain car and commence sweeping out the remaining grain in the said car. In the meantime the table F will be moved on the transverse track G so that the rails 16 of the table F will be brought into alinement with the return track C.

Figure 1:
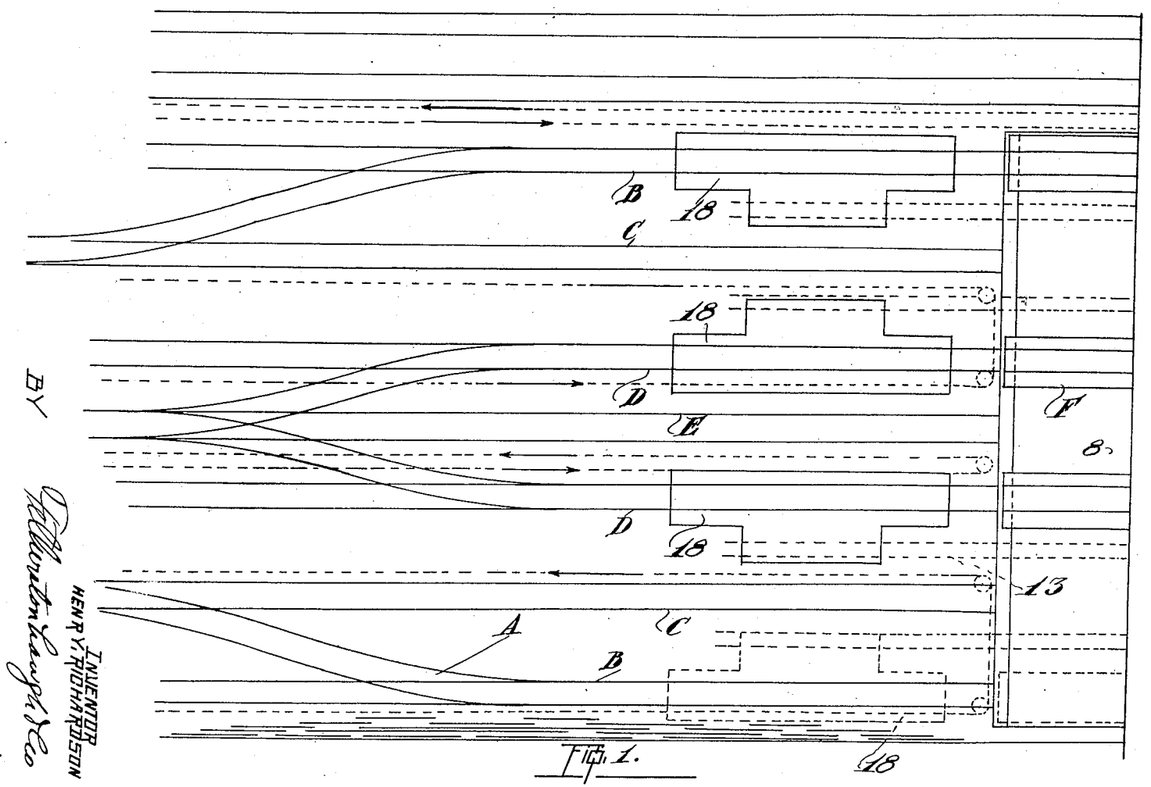
Figures 1 and 1<sup>A</sup> represent a plan view of a track constructed in accordance with my invention.
Figure 1A:
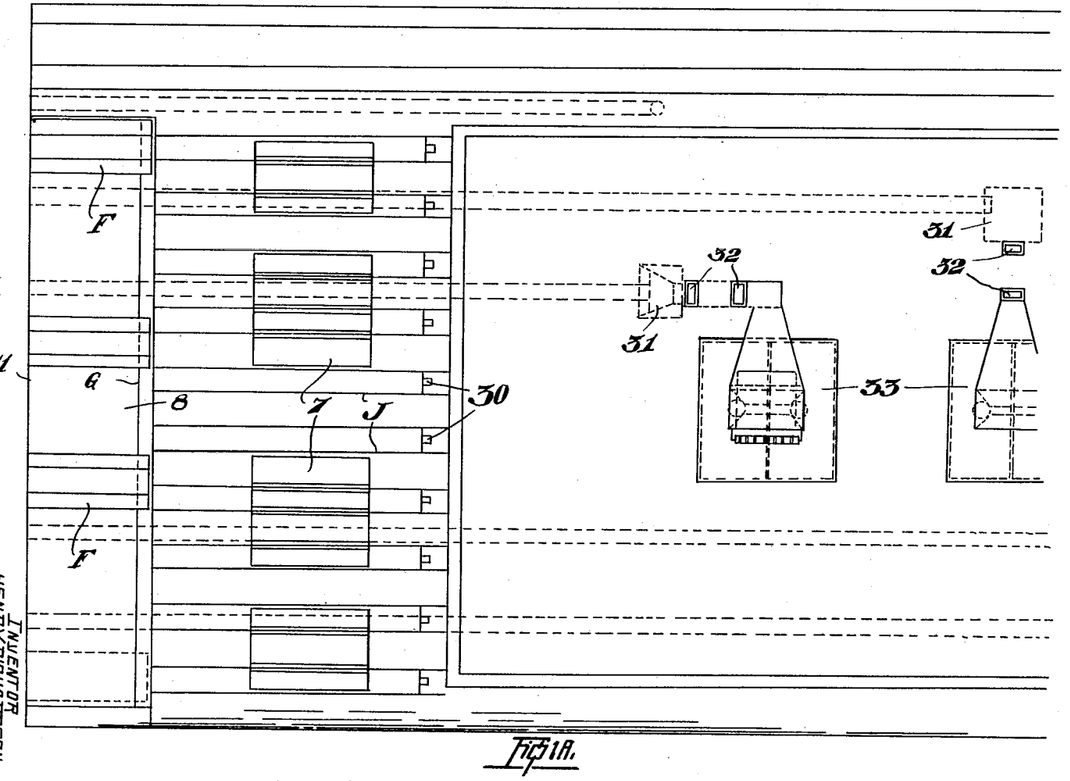
Figure 2:
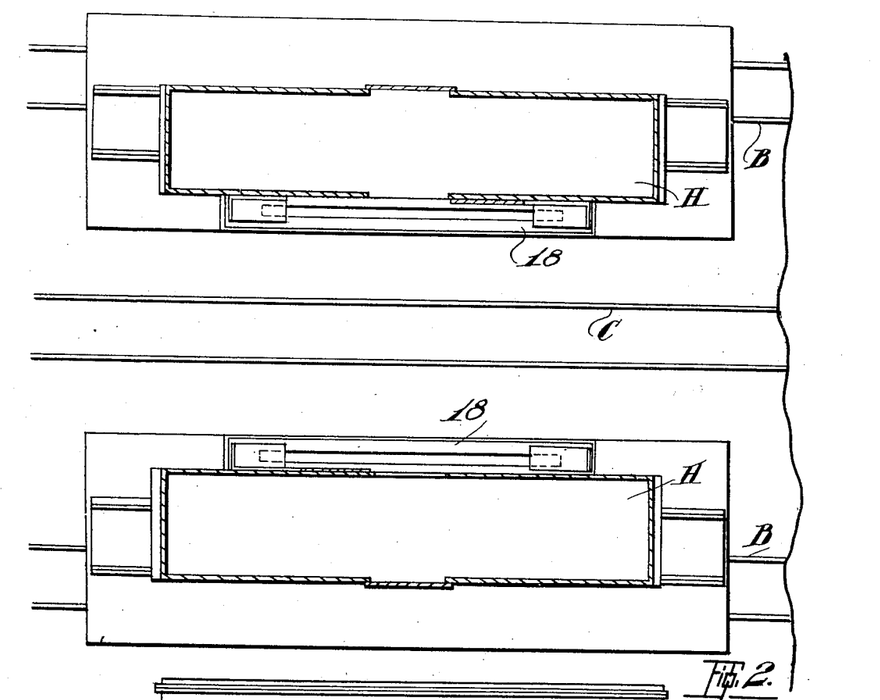
Figs. 2, 2<sup>A</sup> and 2<sup>B</sup> indicate a plan view on an enlarged scale of the several sections of the track construction showing the means whereby the empty grain cars are transferred to a return track after being emptied.
Figure 2A:
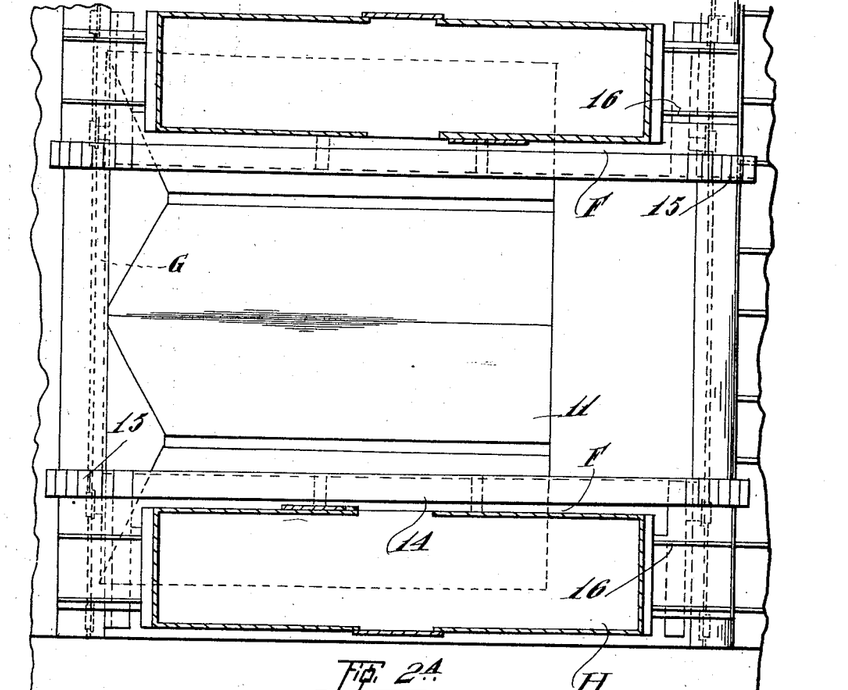
Figure 2B:
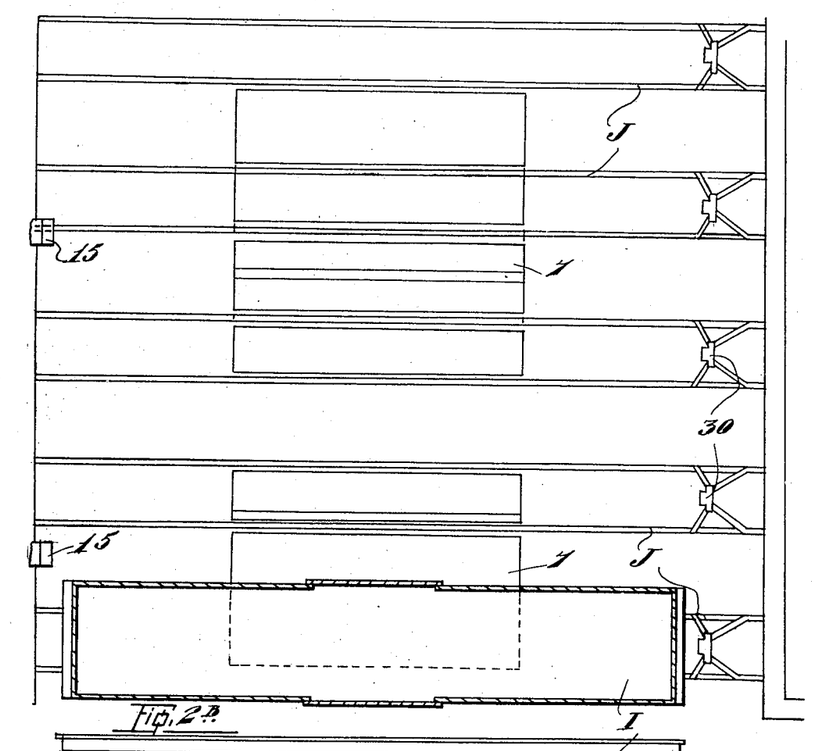
Figure 3:
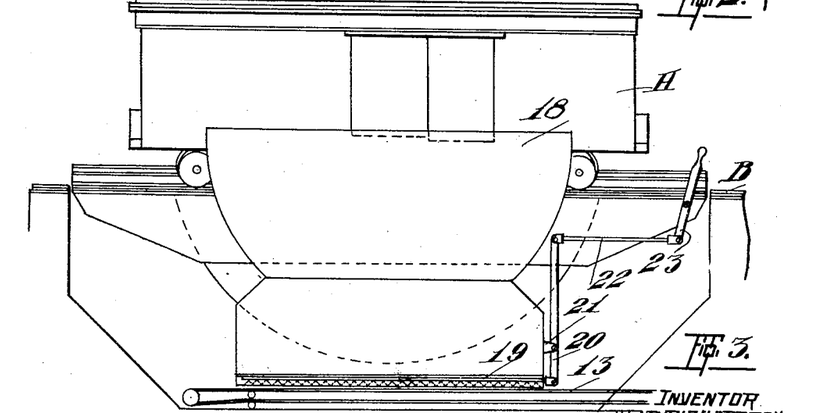
Figure 3A:
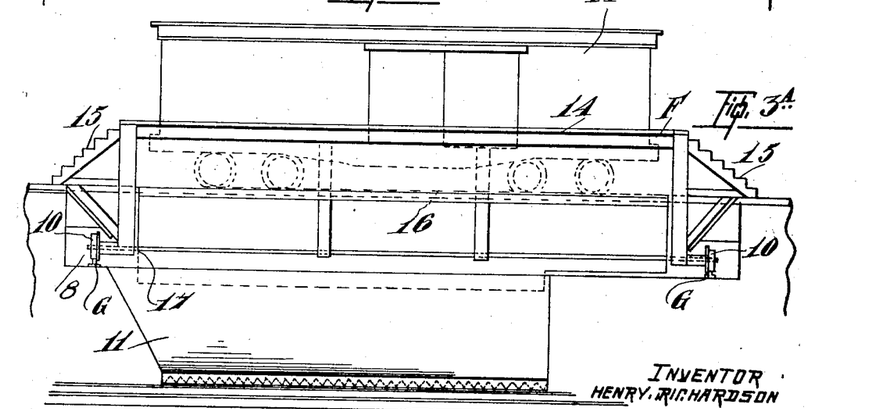
Figure 3B:
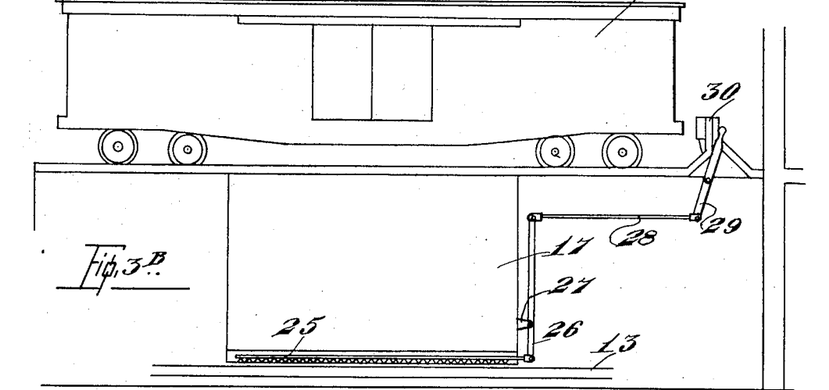
Figure 4:
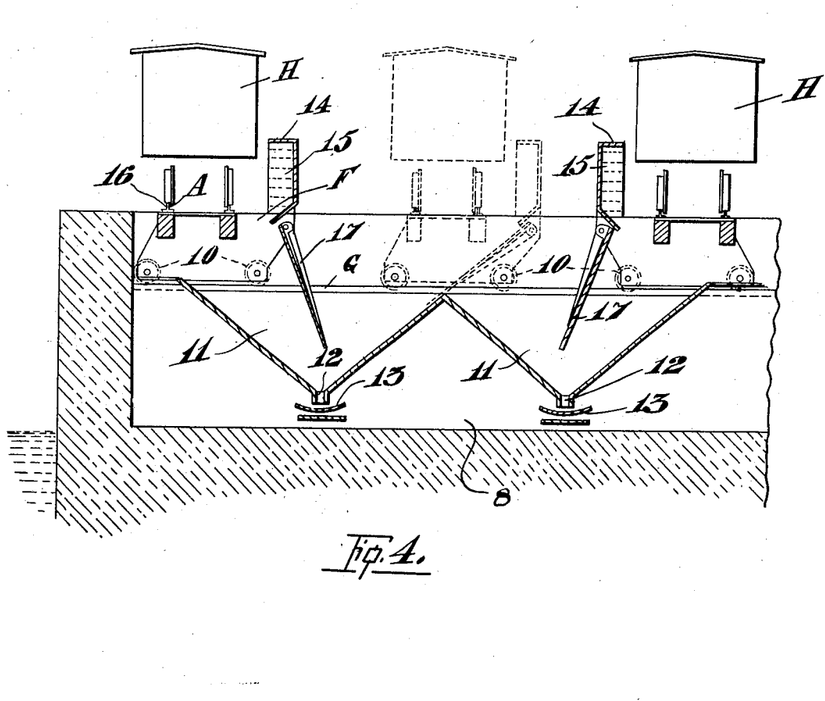
Fig. 4 is a transverse section through the line 2—2 of Fig. 2<sup>A</sup>.

The sweepings which have been discharged from the car H will fall into the hopper 11 and when the table has reached the position shown in Fig. 4, the plate 17 will be angularly disposed and guide or deliver the remaining sweepings of the car into the hopper 11.

As these sweepings are discharged from the hopper 11 they are delivered to a belt conveyer 13 and thus subsequently delivered to the grain elevator in a manner to be made clear hereafter.

When the car H has been completely emptied the table F will have reached the position above described and the car will now be moved, on to the return track C which permits of the empties being continually taken away, while loaded grain cars are brought forward to the hoppers 18 on the track B. In this way a continuous bringing forward and taking away of loaded and unloaded cars H will take place.

The tables F may be constructed in any convenient manner and braced in such a manner as will be calculated to give the desired strength to permit of their fulfilling the functions required of them.

Should bulk head and frozen grain cars I, be brought to this track B, for dumping purposes, they are brought to that track section J, beyond the tables F and the contents are dumped into the hopper which is provided with a discharge valve 25 pivotally attached to the lower end of the lever 26 which is fulcrumed to the bracket 27 on the end of the hopper, the upper end of the lever being attached through the link 28 to the pivotally mounted lever 29 which is adapted on manual operation to actuate the said valve.

These track sections J, which form the end of the track B, C, D and E, may be formed with buffers 30 and form termini beyond which the cars cannot go and the cars I after being dumped will be returned to the tables F and transferred to the return line C or E so that the empties may be taken away.

Figures 5, 6:
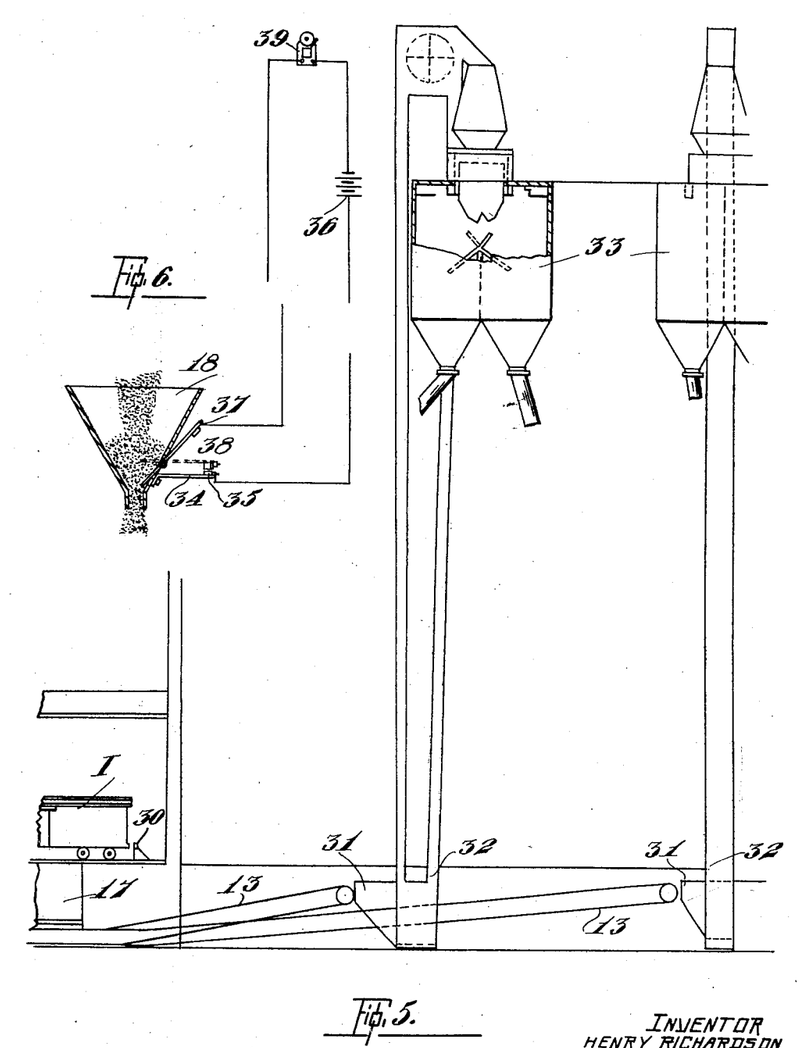
Fig. 5 is a side elevation showing the means whereby the grain is delivered to the hoppers from which the elevators are filled.
Fig. 6 is a diagrammatic view of an audible means for warning the weighman on the elevator when a car has been dumped.

The conveyers 13 extend to and discharge into hoppers 31 located at the lower end of the suction conduit 32 through which the grain is drawn and delivered into the hoppers 33 in the usual manner common to grain elevators.

As the grain is being delivered to the hoppers 33 it is weighed, and the weighman thus determines the contents of each car which has been dumped.

It is essential that the weighman should be notified when each car has been dumped and to this end I provide the lower end of the hopper 18 with an indicating means comprising a bracket 34 provided with a terminal 35 which is electrically connected to a source of electrical supply 36 and with this terminal, a second terminal 37 mounted on one end of a pivoted lever 38 is adapted to co-act, the terminal 37 being connected through an audible warning means 39 to the source of electrical supply 36.

It will be understood that the terminals 35 and 37 will be insulated from their supporting bracket and lever 34 and 38 respectively.

As the grain in the hopper 18 passes therethrough, the weight of the grain on the end of the lever 38 extending into the hopper will press the same downwardly so that the lever 38 will be rotated about its pivotal point and the terminals 35 and 37 will become disengaged as shown in Fig. 6.

As soon as the hopper 18 has been emptied, the lever 38 will gravitate into position shown by the dotted lines and the terminals 37 and 35 will engage closing an electric circuit and sounding the audible means 39, located on the elevator adjacent to the weighing mechanism and thus the weighman will be notified that the hopper is emptied.

The manner in which this device is used will be better understood from the following description.

A grain car H is brought along the track B and after being positioned above the hopper 18, the contents of the cars are dumped thereinto. The valve 19 in the hopper 18 is normally closed and after the car has been dumped the operator superintending the unloading of the cars will actuate the lever 23 thereby opening the valve 19 permitting the grain to be delivered to the conveyer 13 from whence it is carried to the hopper 31 and delivered to the hoppers 33 of the elevator.

As the grain is being delivered to the elevator it will be weighed by the weighman and as soon as the hopper 18 becomes emptied, the lever 38 extending into the hopper will rotate into a horizontal position so that terminals 35 and 37 engage and close the electrical circuit sounding the audible warning means 39 and notifying the weighman that the hopper is empty.

The lever 23 is now operated to close the valve 19 prior to another grain car being dumped and the first grain car H is now pushed onto a table F whereupon the man enters the car H and commences to sweep out the grain left in the car.

As the table F is moved transversely to the track B and C on the track G this sweeping operation is completed and the sweepings are delivered to the hoppers 11, the grain passing onto the conveyer 13 and being delivered to the hopper 31 from whence the grain passes through conduit 32 to the hoppers 33 and the grain is weighed above the hopper in the usual manner.

As soon as the second car H has been dumped, the weight of the grain on the lever 38 will rotate the lever into an angular position and break the circuit by disengaging the conduits 35 and 37 so that the audible warning means ceases and the weighman is then acquainted with the fact that another car of grain is being dumped, so that when the lever 23 is again actuated to open the valve 19 and permit the grain being delivered to the hopper 31, the weighman will know that this grain is from a second car and will commence the weighing of the same in the usual manner.

After the cars H have been moved on the tables F they are delivered to the track C and taken away to be returned to other grain elevators for the purpose of refilling.

When the cars I are being used, they are located above the hoppers 7 and the same operations such as has been above described is repeated. It will be seen that by this method of dumping grain cars, a continuous cycle of operations is performed and no time is lost with the result that the cars of grain are dumped quickly and successively without interruption, so saving a considerable amount of time and also dispensing with a great deal of labor which is at present necessary when grain cars are dumped by other practice than that described in this invention.

As many changes could be made in the above construction, and many apparently widely different embodiments of my invention within the scope of the claims, constructed without departing from the spirit thereof, it is intended that all matter contained in the above specification and accompanying drawings, shall be interpreted as illustrative and not in a limiting sense.

What I claim as my invention is:

1. In an apparatus of the character described and in combination a plurality of parallel tracks, transverse tracks set at the end of the parallel tracks and extending across the same, a transversely movable table mounted on the transverse track and adapted to convey a car from one to the other of the parallel tracks, and means for collecting grain from the table during movement.

2. In an apparatus of the character described and in combination a plurality of parallel tracks, transverse tracks set at the end of the parallel tracks and extending across the same, a transversely movable table mounted on the transverse track and adapted to convey a car from one to the other of the parallel tracks, means for collecting grain from the table during movement, said means including a plurality of hoppers below the transverse tracks, and means for deflecting the grain into the hopper.

3. In an apparatus of the character described and in combination a movable car carrying table, a plurality of hoppers below the table over which the table is adapted to move, deflecting means carried by the table adapted to deflect all the grain falling from the table into one hopper.

4. In an apparatus of the character described and in combination two grain hoppers adjacent to each other, tracks extending across the top of the hoppers, a table mounted on the tracks, a pivoted deflecting member on the table extending into one of the hoppers and adapted to deflect the grain from the table into the said hopper.

5. In an apparatus of the character described and in combination, a plurality of tracks arranged side by side, a plurality of transverse tracks extending across the parallel track, continuation tracks on the opposite side of the transverse track, a transversely movable table mounted on the transverse track, and means for collecting grain from the table during movement.

In witness whereof I have hereunto set my hand in the presence of a witness.

HENRY RICHARDSON.

Witness:
 RUSSEL S. SMART.